United States Patent [19]

Ziegler

[11] Patent Number: 4,459,491
[45] Date of Patent: Jul. 10, 1984

[54] CIRCUIT ARRANGEMENT FOR AUTOMATICALLY CLOSING A REMOTE FEED LOOP OF A REMOTE FEED DEVICE

[75] Inventor: Alfred Ziegler, Munich, Fed. Rep. of Germany

[73] Assignee: Siemens Aktiengesellschaft, Berlin & Munich, Fed. Rep. of Germany

[21] Appl. No.: 455,593

[22] Filed: Jan. 4, 1983

Related U.S. Application Data

[63] Continuation of Ser. No. 226,846, Jan. 21, 1981, abandoned.

[30] Foreign Application Priority Data

Jan. 31, 1980 [DE] Fed. Rep. of Germany ....... 3003515

[51] Int. Cl.³ .............................................. H04B 3/44
[52] U.S. Cl. .................................... 307/64; 179/170 J
[58] Field of Search ........................ 307/64, 66, 65, 80, 307/86; 361/187, 210; 340/333; 179/170 J, 175, 31 R

[56] References Cited

U.S. PATENT DOCUMENTS 4,309,577 1/1982 Kraicar et al. .................. 179/170 J

FOREIGN PATENT DOCUMENTS 0007626 2/1980 European Pat. Off. ......... 179/170 J
2833017 2/1980 Fed. Rep. of Germany .
2833022 2/1980 Fed. Rep. of Germany .

OTHER PUBLICATIONS

Siemens Zeitschrift 45 (1971) Beift "Nachrichtenubertragringstechnik", p. 102, FIG. 5.

Primary Examiner—E. A. Goldberg
Assistant Examiner—Todd E. DeBoer
Attorney, Agent, or Firm—Hill, Van Santen, Steadman & Simpson

[57] ABSTRACT

A protective device for closing a remote feed loop of a remote fed device which automatically operates with interruptions and shorts occurring in the power supplies and wherein the power supplies direct current series feed and a relay with a relay contact closes the remote feed loop in the shunt arm of the circuit. With a particular circuit arrangement the voltage drop across the relay will be reduced by the invention and this is accomplished by using two partial windings connected in series relative to each other with one of the partial windings carrying remote feed current such that premagnetization of the relay occurs and wherein the shunt arm is connected to the point of connection of the two partial windings and the circuit results in that the maximum distance and number of power user stations can be utilized since minimum voltage drop occurs across the relay.

18 Claims, 2 Drawing Figures

CIRCUIT ARRANGEMENT FOR AUTOMATICALLY CLOSING A REMOTE FEED LOOP OF A REMOTE FEED DEVICE

This is a continuation of application Ser. No. 226,846, filed Jan. 21, 1981, now abandoned.

BACKGROUND OF THE INVENTION

1. Field of the Invention

The invention relates in general to a circuit arrangement for the automatic closing of a back-up remote feed loop when interruption of the operationally provided remote feed loop occurs which feeds electrical users with DC series feed current whereby the circuit arrangement includes a relay having break contacts mounted with a resistor in a shunt branch and wherein the windings of the relay comprise two partial windings arranged in series with each other.

2. Description of the Prior Art

Circuit arrangements for protecting and feeding circuits by two different power supplies are known as, for example, in the publication Siemens Zeitschrift vol. 45 (1971), entitled Supplement "Nachrichten-Ubertrastechnik" page 102.

Such known circuit serves to close a remote feed loop for series-fed sub-stations when path interruptions occur. So as to maintain the feed in at least one part of the transmission system a relay coil is provided which is connected in each repeater location and the load resistors of the repeaters are connected in different remote feed current paths. The cross-connections to the relay contact results by way of a shunt circuit consisting of respective series connections of at least two diodes connected in parallel to the load resistors and the relay coil.

With these features the definite position of the relay coil and cross-connection in the remote feed path required in the remote feed systems with uniform load distribution for fault localization is independently achieved whether the relay branch of the switching auxiliary is mounted in one or the other remote feed branch. The switching auxiliary comprises a quadripole which is connected with one pair of terminals to the first part of the remote feed loop or with the pair of feed leads facing the signal source and to the second part of the remote feed loop or respectively of the pair of feed leads facing away from the feed location. Because the relay coil and thus the series branch of the quadripole is alternately mounted in the one or the other remote feed current paths from the repeater location to repeater location and the direction of energy flow in the remote feed loop is always the same and a respective change of the direction of energy flow occurs for the quadripole when they are alternately connected in the reverse direction.

If remotely fed stations such as repeater locations of long distance systems contained so-called switching auxiliaries which in the event of a path interruption reclose the remote feed circuit in front of the faulty remote feed section or respectively repeater section, then the relays in the undisrupted path portion necessary for accomplishing this or for giving fault-free operation of the entire transmission path require excitation power necessary for keeping the switch contact open which results in a corresponding voltage drop at the location of each remotely fed station.

It is desirable to keep this voltage drop as low as possible since with a prescribed maximum remote feed voltage the distance which can be remotely fed will be determined and the higher the voltage drop the shorter will be the remote fed distance that can be utilized.

It is known to provide a winding change-over such that when a relay is activated a part of the winding will be shortcircuited such that the system pull and drop-out values for the relay are accomplished. See for example publication entitled Siemens Zeitschrift 45 (1971), Supplement "Nachrichten-ubertragungstechnik" page 102.

In pratice, only a relatively small portion of the winding flux is available for the holding winding of the relay coil and such flux determines the required holding power and thus the voltage drop of the winding required for this purpose.

SUMMARY OF THE INVENTION

The present invention provides a circuit arrangement for closing the remote feed loop of a remote feed device such that a reduced voltage drop occurs at the relay. According to the invention, the circuit arrangement for achieving such object is designed such that one of the two partial windings lies in the back-up remote feed loop and is closed with a closed break contact and the other partial winding lies in the interrupted part of the operational remote feed loop.

If with such a circuit arrangement, the break contact in the shunt branch is closed, then one of the two partial windings will be traveled by the constant feed current so that the relay is premagnetized. Thus, the relay will more rapidly respond with a smaller number of turns in the windings when only a minimum operating current flows in the other partial winding. A significantly greater flux is available for the holding excitation than in the previously known arrangements. Thus, there will result significantly lower voltage drops at the switching auxiliary in comparison to comparable prior art arrangements so that the range of the remote feed utilizing the present invention will be considerably increased. Also, with the present invention an unpoled relay can be employed instead of a sensitive poled relay so as to get at least the range of the prior art devices using the less expensive relay.

The circuit arrangement for remote feed devices fed at one side can be provided in which the switching auxiliaries are always inserted in the operational remote feed loop in the same manner. This is particularly desirable when one repeater is present at the power user in both respective leads of the remote feed line in repeater locations or the power users are mounted in one and the same lead of the remote feed line. For use in such cases, the circuit arrangement is designed such that one of the two partial windings is mounted in the shunt branch and the other partial winding is mounted in a series branch on the side of the shunt branch facing away from the feed location.

The novel features of the invention result in the advantage that with an excited relay only one of the two partial windings will be excited by a current so that an automatic reduction in the number of turns of the winding effective for the magnetic flux results without a change-over of the winding of the relay being required for such purpose.

In a further development of the invention, the circuit arrangement is designed such that the series connection of both partial windings is inserted in one lead of the remote feed line and a shunt switching circuit consisting of two diode branches is mounted in the other lead of the remote feed line parallel to one of the power users and the shunt branch extends from the junction point of the two diodes on one side and is connected to the junction point of the two partial windings at its other side. Such a circuit arrangement has the advantage that it can be adapted very easily to different power use circumstances. Particularly when the circuit arrangement is employed in remote feed devices with one-sided feed of the remote feed group in which the relay windings lie in one and the same lead of the remote feed line. It is possible to provide the relay with partial windings which have different number of turns.

Also, there are remote feed devices in which the circuit arrangement is alternately inserted in one or the other lead of the remote feed lines from power user location to power user location with the relay winding or the one series branch of the quadripole. In addition, switching auxiliaries for automatic closing of the remote feed loop can also be employed in remote feed devices in which a two sided redundant feed is provided with direct currents which coincide as precisely as possible. For such cases, the circuit arrangement is expediently designed in a manner such that the number of windings of the two partial windings are the same.

In a further development of the invention, diodes are connected in parallel to the partial winding of the relay mounted in one series branch or respectively with the winding of the relay for protection. Since for one polarity the sum of the threshold voltages of the diodes must be greater than the minimum operating voltage of the relay, the reduction of the minimum operating voltage allows one to operate with a lower number of diodes than in the prior art.

In a further development of the invention, the series connection of the two partial windings can be bridged by a variable resistor which can be appropriately set or alternatively by the use of a fixed resistor it can be assured for each relay that the respective same minimum operating current occurs at the rated value of the remote feed current.

It can further prove to be desirable to provide at least one of the two partial windings with a bridging branch which can be connected by means of an operating contact of the relay. Thus, two operating contacts of the relay can expediently lie at the point of the junction of the two partial windings at their low ends and/or respectively conducted to the external terminals of the series connection with the operating size by way of a bridging branch.

The bridging branch can be selected such that the prescribed holding condition for the relay is just achieved with certainty. Bridging branches can be optionally designed as ohmic resistors and/or diodes or as a short circuit bridge.

If each of the two bridging branches respectively contain a diode branch than the voltage drop can be limited at the winding of the relay to a value which is only slightly above the holding value for the relay.

The two bridging branches can be designed differently particularly such that after response of the relay the winding which accomplished the premagnetization is short-circuited and the second winding which holds the relay is bridged with one or more diodes for limitation of the voltage. In response to the relay properties, particularly the ratio of the response to drop out excitation and the holding excitation which are dependent upon the response and drop-out current conditions other windings can also be selected.

It can also prove expedient to design the circuit arrangement such that two operating contacts of the relay respectively are mounted at the junction point of the two partial windings where their low ends meet and are conducted to the external terminals of the series connection with their operating side through a respective bridging branch.

In a further development of the invention, with two sided redundant feed of remote feed loop and/or with an arrangement of the windings of the relay which is alternatively in the one or in the other branch of the remote feed line the two bridging branches can be designed in the same fashion. The contacts of the relays can be formed as double-throw switch contacts.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
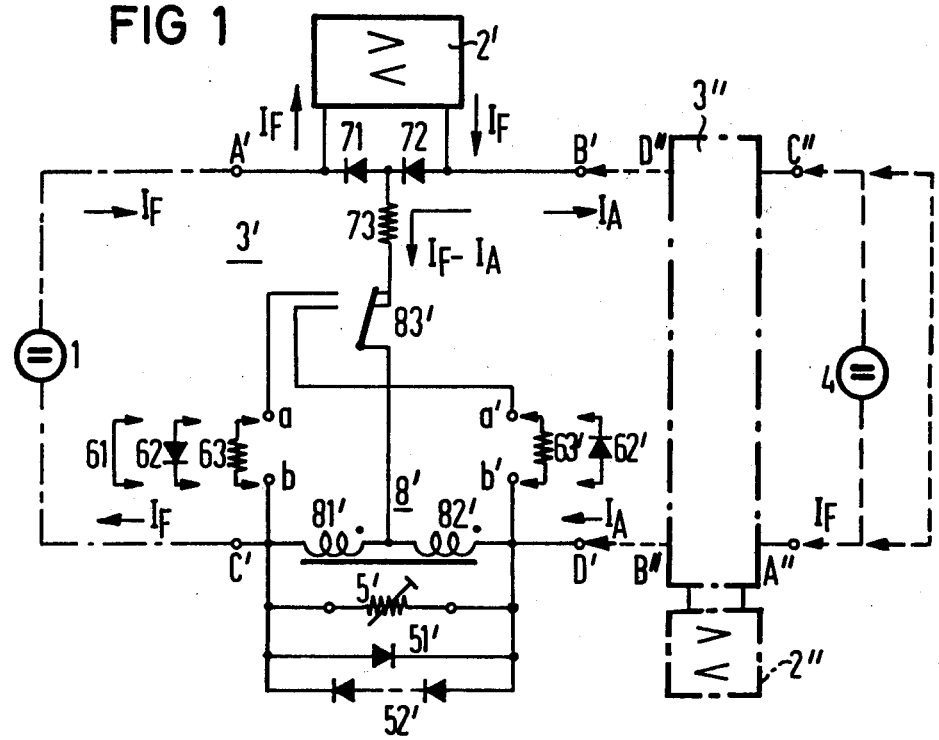
FIG. 1 is an electrical schematic of a switching auxiliary which can be adapted to various power use situations.

FIG. 1 illustrates a direct current power supply 1 which has its positive terminal connected to terminal A and its negative terminal connected to terminal C and supplies constant direct current $I_F$. A way station 2' has one terminal connected to terminal A' and a second terminal connected to terminal B' and the line current $I_F$ is supplied to the way station 2' which can be a regenerator or a repeater location which uses power. The power user may be a linear repeater which contains an individual repeater per transmission direction of the communication transmission path. The user devices 2' and 2'' are not illustrated in greater detail but they may be fed in parallel either directly or via an auto-converter so that a parallel/series feed results for the circuit arrangement for the purpose of remote feed. A pair of diodes 71 and 72 poled as shown are connected across the input terminals of the user device 2' and are poled as shown so as to block positive current from passing between terminal A' and B' except through the user device 2'. A switching auxiliary 3' is associated with the user device 2' and comprises a resistor 73 which has one side connected to the junction point between the diodes 71 and 72 and a relay 8' which has switch contacts 83' which in the unenergized position contacts one end of the resistor 73. The other end of the movable contact of the relay switch is contacted to the junction point between a pair of partial relay windings 81' and 82' as shown which are connected between terminals D' and C'. A second user terminal 2'' is connected in the positive line from a second power source 4 which produces line current $I_F$ and the power supply 4 is connected with opposite polarity to the lines from power source 1 so that the current $I_F$ from the power user 2'' feeds into point D' from the right as shown and passes through the partial winding 82' of the relay 8. A switching auxiliary 3" is associated with the power user 2" as shown. The switching auxiliaries 3' and 3" are alternatively connected from one way station to way station in one or the other remote feed current paths so as to achieve a uniform load distribution or alternatively to achieve a compensation of the influence due to induced alternating currents along the path. However, under certain conditions they can also be inserted in one and the same remote feed line or respectively in one and the same remote feed current path.

The pair of remote feed leads are respectively connected at opposite ends to the remote feed power supply device 1 or respectively 4 so that a two-sided feed with simultaneously existing power supply devices results so as to provide redundancy. Thus a series connection of the two remote feed devices 1 and 4 is effective in the remote feed circuit. Each of the remote feed devices 1 and 4 is capable of supplying the entire remote feed path according to the principle of "hot reserve".

As soon as the connection between the feed leads occurs, remote feed device 1 feeds up to the connected location. The remote feed device 4 also feeds up to the connection location so that the entire path will remain supplied.

Uninterrupted operation of the user way stations 2' and 2" results because the switching auxiliaries 3' or, respectively, 3" are provided for each power using station 2' and 2". The switching auxiliaries when an interruption of one or both of the feed leads occur closes the remote feed circuit in front of the interruption location such that the way stations 2' and 2" continue to be supplied with power.

After elimination of the power interruption, the lead connection at the switching auxiliary is automatically reversed.

The switching auxiliaries 3' and 3" are connected into the remote feed circuit between the terminals A' and C' or A" and C" on one side and the terminals B' and D' or B" and D" on the other side.

The winding start of one of the partial windings 81' and 82' is connected to the winding end of the other partial winding. If the path interruption occurs in the direction of terminals B' D' then the repeater 2' continues to be operated from the direction of terminals A' through C'. The feed current passes from terminal A' through the repeater 2' (the diode 71 blocks the current) then through the diode 72, the resistor 73 contact 83' which is in engagement as shown in the FIG. and then through the partial winding 81' to terminal C'. The relay 8' monitors the direction of faults in the direction of terminals B' and D' at this time.

If the path interruption occurs in the direction of terminals A' and C' then the repeater 2' continues to be operated proceeding from the direction of terminals B' and D'. The current flows from terminal D' from the power supply 4 through partial winding 82' then through contact 83', the resistor 73, the diode 71 through repeater 2' to the terminal B'. The relay 8' during this condition monitors faults in the directions of terminals A' and C.

If the current supply source 4 is short-circuited then the feed path occurs solely by the current source 1.

Significantly lower voltage drops occur in the circuit arrangement of FIG. 1 as compared to prior art arrangements and this circuit is suitable for alternate use of the intermediate repeaters or for a two-sided redundant remote feed. The relay coil of relay 8' contains two identical partial windings 81' and 82' with their center connection connected to the two-way contact 83'. If this contact is closed, one of the two partial windings will always carry the constant remote feed current $I_F$ which will result in premagnetization of the relay 8'. The number of winding turns n are the same for both of the partial windings 81' and 82' and the number of turns is selected such that the relay 8 is excited by a flux $\phi_{An}$ in this condition when the minimum operating current $I_{An}$ flows in the other winding. The following equation applies:

$$I_F \cdot n + I_A \cdot n = \phi_{An}.$$

When the two-way contact 83' has opened and moved from its position shown in FIG. 1 to engage the contacts shown to the left in FIG. 1, a shunt can be connected in parallel between points a-b and/or points a' and b' to shunt one or both of the partial windings 81' and 82'. The conductance of the shunt can be selected such that the prescribed holding path of the relay is accomplished. This will allow the voltage drop to be limited to a magnitude which lies only slightly above the holding value. In other words, when the relay 8' is energized to move the contact 83' from its position to the right in FIG. 1 to the position to the left in FIG. 1, a smaller holding current is required then the pull-in current and either by applying a direct short across contact a and b, or a diode 62 across such contacts or resistor 63 across such terminals can allow the holding current to be maintained with a minimum voltage drop. Also, the diode 62' may be connected across the terminals a' b' or, alternatively, the resistor 63' may be connected between terminals a' and b'.

Since due to the premagnetization with the remote feed current, the deviation of, for example, ±6 mA at 300 mA ±2% influences the response of the relay, it is expedient to eliminate the scattering of the response values of the various relays caused by manufacturing variations which will substantially reduce the cost of manufacturing. A resistor 5' is mounted in parallel with the windings 81' and 82' for this purpose. The resistor is selected for each relay such that the same minimum operating current results with the nominal value of the remote feed current. With a variation of the remote feed current of for example 294 through 306 mA the current lies in an admissable range between 68 mA and 56 mA.

The drop-out current $I_{Ab}$ for the relay can be calculated as follows:

$$I_{Ab} = \tfrac{1}{2}(I_F + I_{An})\frac{\phi_{Ab}}{\phi_{An}}$$

$I_F$ Remote Feed Current
$I_{An}$ Minimum Operating Current
$\phi_{An}$ Response Excitation
$\phi_{Ab}$ Drop-Out Excitation The value $I_{Ab}$ can, if necessary, be achieved by shunting the relay windings after response has occurred using the switching contacts 61, 62, 63, 62', and/or 63'.

FIG. 1 also illustrates the remote station 2" in the second feed line and its associated auxiliary switching auxiliary 3" but the details are the same or similar to the units 2' and 3' and are not shown in detail.

Figure 2:
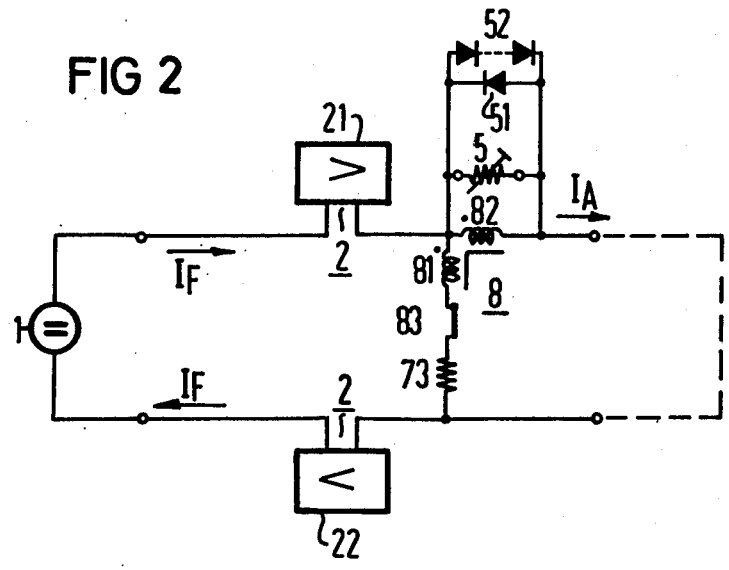
FIG. 2 is an electrical schematic of a switching auxiliary for remote feed loops with single side feed.

FIG. 2 illustrates a modification of the invention wherein the current supply source 1 supplies current $I_F$ and there is only one intermediate repeater location shown in the Figure. The intermediate repeater location contains two repeaters with the feed input of one of the repeaters 21 in one lead of the power supply. The other feed input of the other repeater 22 has its feed input in the other feed line of the power supply 1. The leads of the remote feed line or respectively the current paths of the remote feed loop can, for example, be the inner conductors of coaxial cables of a four-wire communication transmission device.

The repeater location 2 is provided with a switching auxiliary which is mounted in the path of the remote feed line on the side of the repeaters 21 and 22 which is away from the current source 1. The switching auxiliary contains a relay 8 which has a pair of partial windings connected in series relative to each other such that like terminals for example the winding beginnings of the two partial windings are connected together. The switching auxiliary forms a quadripole in the form of a half section. The shunt branch of the half section is a series connection consisting of the partial winding 81, the relay break contact 83 of the relay 8 and a resistor 73 which is connected to the opposite side of the power line. The partial winding 82 is connected in parallel with the variable resistor 5 and the diode branches 51 and 52 connected as shown.

When the remote feed device is placed in operation then the remote feed loop is first closed through the shunt arm of the auxiliary switching auxiliary which means that contact 83 is closed. If an intact remote feed loop exists, the remote feed current will be distributed to the two partial windings 81 and 82 as a function of the resistance of the shunt arm and the loop resistance of the following part of the remote feed loop. The current flowing through the partial winding 81 accomplishes premagnetization of the relay 8. The current flowing through the partial winding 82 generates an additional magnetic flux which will cause the relay to respond if an intact remote feed loop occurs. The break contact 83 will then open so that the shunt arm becomes free of current and the entire remote feed current flows across the series arm through the winding 82.

The resistor 5 in parallel to the partial winding 82 serves the purpose for matching the response values of the various relays to each other and is selected such that the same minimum operating current $I_A$ respectively results for a given nominal value of the remote feed current.

The diode branch 51 consists of a single diode. The diode is poled for the remote feed current in the reverse direction. The diode branch 52 which is connected in parallel with the diode 51 comprises a series connection of a plurality of diodes which are as many as are required so that the sum of the threshold voltages is greater than the voltage drop across the partial winding when an excited relay 8 occurs.

It is to be realized that the resistor 5' in FIG. 1 can also be varied as shown in the drawing.

Although the invention has been described with respect to preferred embodiments, it is not to be so limited as changes and modifications can be made which are within the full intended scope of the invention as defined by the appended claims.

I claim as my invention:

1. A circuit arrangement for automatically closing a backup remote feed loop for a power line comprising a pair of DC power supplies, first and second feed points connected to the positive and negative terminals of said first power supply, third and fourth feed points connected to the positive and negative terminals of said second power supply, first and second diodes connected between the first and third feed points and arranged with the same polarity and so as to block current from the power supplies, a first load device connected in parallel with said first and second diodes, a relay with two partial windings connected in series between said second and fourth feed points, said relay having a switch contact which is controlled such that when the relay is in the unenergized condition switch contact closes the circuit between the junction point between said first and second diodes and the junction point between said first and second partial windings, and when said relay is energized said switch is open.

2. A circuit arrangement according to claim 1, characterized with two-sided redundant feed of the remote feed loop and/or given an arrangement of the winding (81', 82') of the relay (8) alternately in one or the other branch of the remote feed line, both bridging branches (a, b; a', b') have similar design.

3. A circuit arrangement according to claim 1 comprising a third and a fourth diode connected in parallel with said first and second partial windings.

4. A circuit arrangement according to claim 1 comprising a variable resistor connected in parallel with said partial windings.

5. A circuit arrangement according to claim 1 characterized in that the number of turns of the two partial windings (81', 82') are approximately the same (FIG. 1).

6. A circuit arrangement according to claim 1, characterized in that at least one of the two partial windings (81', 82') is provided with a series connection consisting of an operating contact of the relay (8) and of a bridging branch (ab; a', b').

7. A circuit arrangement according to claim 1 characterized in that two operating contacts of the relay (8) lie at the junction point of the two partial windings (81', 82') at their low end and are connected at their operating sides to the external connections of the series connection through respective one of the bridging branches (a, b; a', b').

8. A circuit arrangement according to claim 1 characterized in for a two-sided, redundant feed of the remote feed loop and/or given an arrangement of the partial windings (81', 82') of the first relay (8) alternately in the one or the other branch of the remote feed line, both bridging branches (a, b; a', b') are designed the same.

9. A circuit arrangement for automatically closing a backup remote feed loop for a power line comprising one DC power supply, first and second feed points connected to the positive and negative terminals of said power supply, third and fourth feed points connected to each other, first and second diodes connected between the first and third feed points and arranged with the same polarity and so as to block current from the power supply, a first load device connected in parallel with said first and second diodes, a relay with two partial windings connected in series between said second and fourth feed points, said relay having a switch contact which is controlled such that when the relay is in the unenergized condition switch contact closes the circuit between the junction point between said first and second diodes and the junction point between said first and second partial windings, and when said relay is energized said switch is open.

10. A circuit arrangement according to claim 9 comprising a third and a fourth diode connected in parallel with said first and second partial windings.

11. A circuit arrangement according to claim 9 comprising a variable resistor connected in parallel with said partial windings.

12. A circuit arrangement according to claim 9 characterized in that the number of turns of the two partial (81', 82') are approximately the same (FIG. 1).

13. A circuit arrangement according to claim 9, characterized in that at least one of the two partial windings (81', 82') is provided with a series connection consisting of an operating contact of the relay (8) and of a bridging branch (ab; a', b').

14. A circuit arrangement according to claim 9 characterized in that two operating contacts of the relay (8) lie at the junction point of the two partial windings (81', 82') at their low end and are connected at their operating sides to the external connections of the series connection through respective one of the bridging branches (a, b; a', b').

15. A circuit arrangement according to claim 9 characterized in for a two-sided, redundant feed of the remote feed loop and/or given an arrangement of the partial windings (81', 82') of the first relay (8) alternately in the one or the other branch of the remote feed line, both bridging branches (a, b; a', b') are designed the same.

16. A circuit arrangement according to claim 9 characterized with two-sided redundant feed of the remote feed loop and/or given an arrangement of the winding (81', 82') of the relay (8) alternately in one or the other branch of the remote feed line, both bridging branches (a, b; a', b') have similar design.

17. A circuit arrangement for automatically closing a backup feed loop, comprising a direct current power supply, first, second, third and fourth feed points with the first and second feed points connected to the output terminals of the power supply, said third and fouth feed points connected to each other, a first load connected between the second and fourth feed points, a relay with two partial windings and with the first one of said partial windings and a second load device connected in series between said first and third feed points, a relay switch contact, a resistor and said second partial winding connected in series between the junction point between said first load and said first partial winding and the fourth feed point.

18. A circuit arrangement according to claim 17 characterized in that said diodes (51, 52) are connected in parallel to the other partial winding (82) lying in a series branch for the protection of the first relay (8).

* * * * *